United States Patent
Claus (10) Patent No.: US 6,973,157 B2
(45) Date of Patent: Dec. 6, 2005

(54) METHOD AND APPARATUS FOR WEIGHTED BACKPROJECTION RECONSTRUCTION IN 3D X-RAY IMAGING

(75) Inventor: Bernhard Erich Hermann Claus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 123 days.

(21) Appl. No.: 10/744,327

(22) Filed: Dec. 23, 2003

(65) Prior Publication Data

US 2005/0135559 A1 Jun. 23, 2005

(51) Int. Cl.[7] ................................. A61B 6/03
(52) U.S. Cl. ....................... 378/8; 378/22; 378/901
(58) Field of Search ..................... 378/4, 8, 15, 22, 378/23, 901; 250/363.01, 363.02, 363.03, 250/363.04, 363.05; 382/131

(56) References Cited

U.S. PATENT DOCUMENTS

| | | | |
|---|---|---|---|
| 4,903,204 A | | 2/1990 | Dobbins, III |
| 5,812,628 A | * | 9/1998 | Hsieh ........................... 378/8 |
| 2003/0072478 A1 | | 4/2003 | Claus et al. ................ 382/131 |
| 2003/0194049 A1 | | 10/2003 | Claus et al. ................. 328/22 |
| 2004/0240604 A1 | * | 12/2004 | Wang et al. .................. 378/19 |

OTHER PUBLICATIONS

D.G. Grant, et al, "Tomosynthesis: A three-dimensional radiographic imaging technique", IEEE Trans on Biomedical Engineering, vol. BME-19, No. 1, pp.: 20-28, Jan. 1972.
Verhoeven D., "Limited-Data Computed Tomography Alogorithms for the Physical Sciences", Appl. Optics, vol. 32, No. 20, Jul. 1993.
Claus, et al, "A new method for 3D Reconstruction in Digital Tomosynthesis", Proc. SPIE vol. 4684, Medical Imaging 2002- Image Processing, San Diego, CA, 2002.
Suryanarayanan et al, Evaluation of linear and nonlinear tomosynthetic reconstruction methods in digital mammography Acad. Radiol. 8 pp.: 219-224.

* cited by examiner

Primary Examiner—David V Bruce
(74) Attorney, Agent, or Firm—Fletcher Yoder (57) ABSTRACT

A method and computer readable medium for generating a reconstructed volumetric image from projection image data acquired from an imaging system is provided. The method comprises accessing a plurality of projection image data and generating one or more weight maps from the projection image data. The reconstructed volumetric images are then generated from the weight maps and at least one of the plurality of projection image data and a plurality of processed projection image data derived from the plurality of projection image data.

30 Claims, 4 Drawing Sheets

METHOD AND APPARATUS FOR WEIGHTED BACKPROJECTION RECONSTRUCTION IN 3D X-RAY IMAGING

BACKGROUND OF THE INVENTION

The present invention relates generally to the field of imaging, and more specifically to the field of X-ray imaging systems. In particular, the invention relates to a method and apparatus for three-dimensional image reconstruction using X-ray imaging systems.

In three-dimensional (3D) X-ray imaging techniques, such as X-ray tomosynthesis, projection images are acquired for varying positions of one or more X-ray sources relative to the imaged object. X-ray beams are generated by one or more X-ray sources, and are generally collimated prior to passing through the object being scanned. The attenuated beams are then detected by a set of detector elements. Each detector element produces a signal based on the intensity of the attenuated X-ray beams, and the resulting signals are processed to produce projection images. From these projection images, a volumetric image, that is a 3D representation of the imaged object, is reconstructed. Typically, the reconstructed volumetric image is arranged in slices that are parallel to the detector plane.

It may be said that tomosynthesis imaging is an example of an imaging modality wherein only somewhat incomplete data is available for reconstruction. When only incomplete data is available, a perfect reconstruction in the mathematical sense is not possible. Therefore, volumetric images obtained with most reconstruction methods exhibit artifacts, for example due to high-contrast structures in the imaged volume. These artifacts make image interpretation and visualization steps difficult and challenging. In particular, for backprojection type image reconstruction techniques, high-contrast structures in the projection images result in the creation of streak artifacts. The streak artifacts are typically caused by high-contrast structures being backprojected or smeared across the volume to be reconstructed. In certain situations, these artifacts may distract the physician from clinically relevant information, and can even be erroneously interpreted as significant structures within the imaged volume.

A number of reconstruction algorithms are known in the art for reconstructing volumetric images representative of the 3D structures within the imaged volume from projection images acquired with tomosynthesis systems. These reconstruction techniques include, for example, matrix inversion tomosynthesis (MITS), order statistics-based backprojection (OSBP), shift-and-add, simple backprojection, generalized filtered backprojection (GFBP), algebraic reconstruction techniques (ART), direct algebraic reconstruction techniques (DART) and Fourier-based reconstruction techniques.

However, the above reconstruction techniques suffer from several disadvantages, including the presence of streak artifacts in the reconstructed volumetric image, which may present themselves in any given slice as out-of-plane structures caused by high contrast structures in the object to be imaged. In addition, the above techniques suffer from the presence of additional artifacts, for example due to missing image data at detector boundaries or in image areas where the presence of a high-attenuation object precludes the collection of useful projection image data. Therefore, there exists a need in the art for an improved reconstruction technique for generating volumetric image data and reconstructed volumetric images with reduced artifacts, as well as for strategies for handling missing image data, for example at detector boundaries.

BRIEF DESCRIPTION OF THE INVENTION

The present invention provides novel techniques designed to respond to such needs. In one embodiment, a technique for generating reconstructed volumetric images is provided. The method comprises accessing a plurality of projection images and generating one or more weight maps. The reconstructed volumetric image is then generated from the weight maps and at least one of the plurality of projection images and a plurality of processed projection images derived from the plurality of projection images.

In another embodiment, an imaging system for generating reconstructed volumetric images from projection image data is provided. The system comprises an X-ray source configured to project an X-ray beam from a plurality of positions through the subject of interest, and a detector configured to produce a plurality of signals corresponding to the attenuated X-ray beam passing through the subject. The system further comprises a computer configured to process the plurality of signals to generate a plurality of projection images. The projection images each generally comprise a plurality of picture elements, or pixels. The computer is further configured to generate one or more weight maps. A reconstructed volumetric image may be generated from the one or more weight maps and from at least one of the plurality of projection images and a plurality of processed projection images derived from the plurality of projection images.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
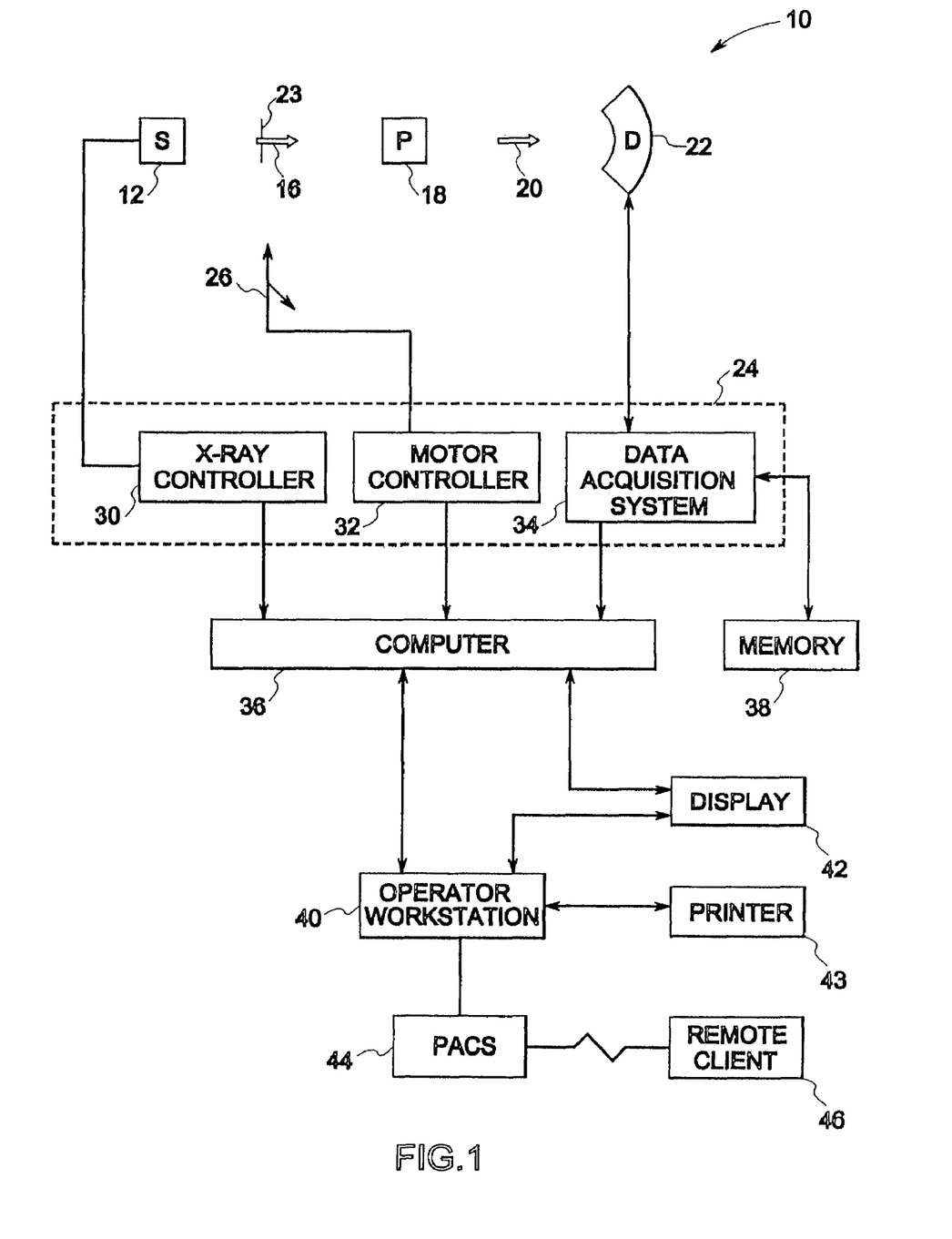
FIG. 1 is a diagrammatical view of an exemplary imaging system in the form of a tomosynthesis system for scanning an object in accordance with aspects of the present technique.

FIG. 1 illustrates diagrammatically an imaging system 10 which may be used for acquiring and processing projection image data and reconstructing a volumetric image representative of the imaged object. In the illustrated embodiment, the system 10 is a tomosynthesis system designed both to acquire projection image data, and to process the image data for display and analysis in accordance with the present technique. In the embodiment illustrated in FIG. 1, the imaging system 10 includes a source 12 of radiation, which is typically X-ray radiation in tomosynthesis; the source 12 is freely movable relative to the imaged object. In this exemplary embodiment, the X-ray radiation source 12 typically includes an X-ray tube and associated support and filtering components. In certain systems, however, more than one source of radiation may be employed.

A stream of radiation 16 is emitted by the source 12 and impinges an object 18, for example, a patient in medical applications. A portion of the radiation 20 passes through or around the object and impacts a detector array, represented generally at reference numeral 22. Detector elements of the array produce electrical signals that represent the intensity of the incident X-ray beam. These signals are acquired and processed to reconstruct a volumetric image of the features within the object. A collimator 23 may define the size and shape of the X-ray beam 16 that emerges from the X-ray source 12.

While the present technique is described herein with reference to medical imaging applications, it should be noted that the invention is not limited to this or any particular application or environment. Rather, the technique may be employed in a range of applications, such as baggage and parcel handling and inspection, part inspection and quality control, and so forth, to mention but a few.

Source 12 is controlled by a system controller 24 which furnishes both power and control signals for tomosynthesis examination sequences, including positioning of the source 12 relative to the object 18 and the detector 22. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a positional subsystem 26 which positions the X-ray source 12 relative to the object 18 and the detector 22. In alternative embodiments the positional subsystem 26 may move the detector 22 or even the object 18 instead of the source 12 or together with the source 12. In yet another embodiment, more than one component may be movable, controlled by the positional subsystem 26. Thus, radiographic projections may be obtained at various angles through the object 18 by changing the relative positions of the source 12, the object 18, and the detector 22 via the positional subsystem 26 according to various embodiments illustrated herein below in detail. As noted above, certain systems may employ distributed sources or radiation, and such systems may not require such displacement of the sources.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the positional subsystem 26.

Further, the system controller 24 is also illustrated comprising a data acquisition system 34. The detector 22 is typically coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory adapted to store a large amount of data may be utilized by such an exemplary system 10. Also the computer 36 is configured to receive commands and scanning parameters from an operator via an operator workstation 40, typically equipped with a keyboard and other input devices. Computer 36 also performs the reconstruction of a volumetric image from the projection image data set. The projection images or the volumetric images may be transmitted to the display 42 for review and moreover, to a memory 38 for storage. An operator may control the system 10 via the input devices. Thus, the operator may observe the projection images or the reconstructed volumetric image and other data relevant to the system from computer 36, initiate imaging, and so forth. All these functions may be carried out by a single computer, or they may be distributed across several computers, maybe comprising specific hardware, for example for fast reconstruction.

A display 42 coupled to the operator workstation 40 may be utilized to observe the reconstructed volumetric image, or a suitably processed version thereof, and to control imaging. Additionally, the image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and the operator workstation 40 may be coupled to other output devices, which may include standard or special purpose computer monitors and associated processing circuitry. One or more of the operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
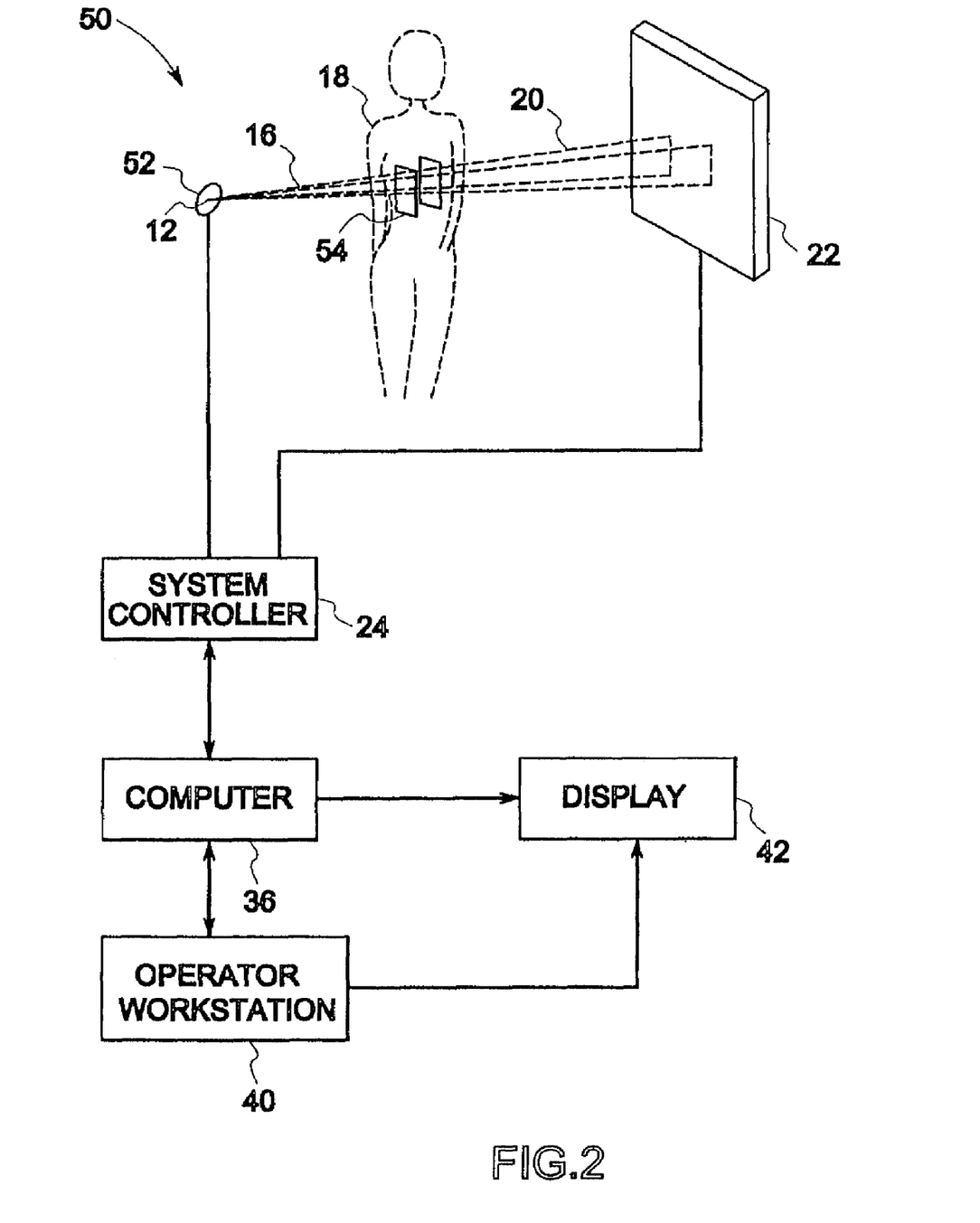
FIG. 2 is a diagrammatical view of a physical implementation of the tomosynthesis system of FIG. 1.

Referring generally to FIG. 2, an exemplary imaging system utilized in a present embodiment may be a tomosynthesis imaging system 50. In an arrangement similar to that described above, the tomosynthesis imaging system 50 is illustrated with a source 12 and a detector 22 between which an object, illustrated as a patient 18, may be disposed. The source of radiation 12 typically includes an X-ray tube, which emits X-ray radiation from a focal point 52. The stream of radiation is directed towards a particular region 54 of the patient 18. It should be noted that the particular region 54 of the patient 18 is typically chosen by an operator so that the most useful scan of a region may be made.

In a typical operation, X-ray source 12 is positioned opposite the detector 22, with the patient 18 (or other subject or object of interest) disposed between. The X-ray source 22 may then project an X-ray beam from the focal point 52 toward detector array 22, through the patient 18. The detector 22 is disposed generally opposite to the X-ray source 12, relative to the patient 18. The detector 22 is generally formed by a plurality of detector elements, generally corresponding to pixels, which sense the intensity of X-rays that pass through and around a region of interest 54, such as particular body parts, for instance the chest, lungs and so on. Depending upon the X-ray attenuation and absorption for the intervening structures, the radiation impacting each pixel region will vary. In one embodiment, the detector 22 consists of a 2,048×2,048 rectangular array of elements, with a pixel size of 200 $\mu$m×200 $\mu$m, though other configurations and sizes of both detector 22 and its pixels are, of course, possible. Each detector element produces an electrical signal that represents the intensity of the X-ray beam at the position of the element on the detector.

Furthermore, the source 12 may be moved, typically within a plane (although it may be moved outside of a single plane), which is substantially parallel to the detector 22. A plurality of radiographic views from different view angles may thus be collected by the computer 36. In one embodiment the distance between the source 12 and the detector 22 is approximately 180 cm and the total range of motion of the source 12 is between 31.5 cm and 131 cm, which translates to ±5° to ±20° where 0° is a centered position. In this embodiment, typically at least eleven projections are acquired, covering the full angular range. Clearly, however, many variations on these arrangements and specifications may be envisioned.

The computer 36 is typically used to control the entire tomosynthesis system 50. The main computer that controls the operation of the system may be adapted to control features enabled by the system controller 24. Further, the operator workstation 40 is coupled to the computer 36 as well as to a display, so that the acquired projection images as well as the reconstructed volumetric image may be viewed.

Data collected from the detector 22 then typically undergo correction and pre-processing to condition the data to represent the line integrals of the attenuation coefficients of the scanned objects, although other representations are also possible. The processed data, commonly called projection images, are then typically input to a reconstruction algorithm to formulate a volumetric image of the scanned volume. In tomosynthesis, a limited number of projection images are acquired, typically thirty or less, each at a different angle relative to the object and detector. Reconstruction algorithms are typically employed to perform the reconstruction on this projection image data to produce the volumetric image.

Once reconstructed, the volumetric image produced by the system of FIGS. 1 and 2 reveals the three-dimensional characteristics and spatial relationships of internal features of the subject 18. Reconstructed volumetric images may be displayed to show the three-dimensional characteristics of these features and their spatial relationships. The reconstructed volumetric image is typically arranged in slices. In some embodiments, a single slice may correspond to features of the imaged object located in a plane that is essentially parallel to the detector plane. Though the reconstructed volumetric image may comprise a single reconstructed slice representative of structures at the corresponding location within the imaged volume, more than one slice image is typically computed.

Figure 3:
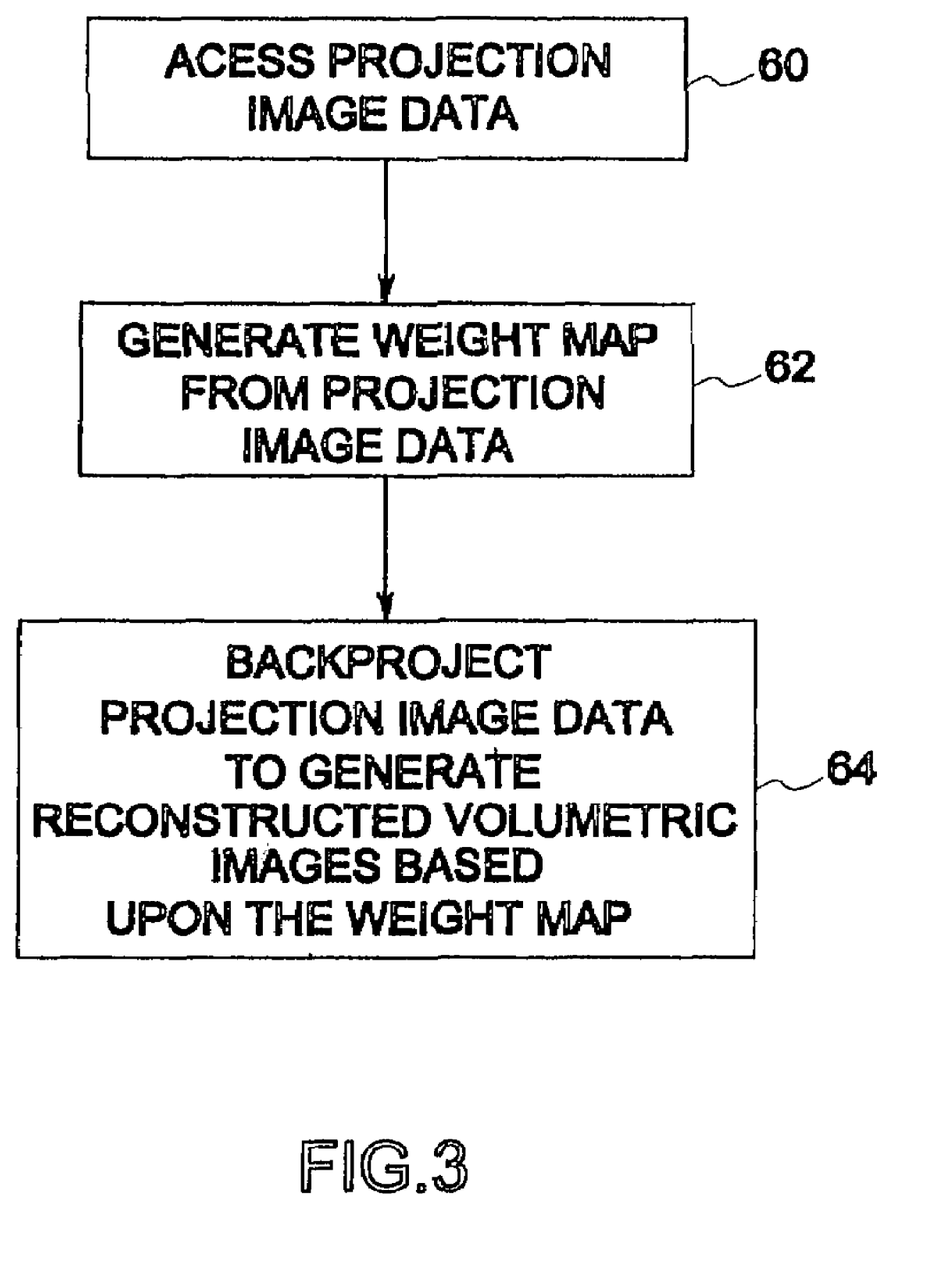
FIG. 3 is a high level flowchart depicting exemplary steps of the reconstruction method for minimizing reconstruction artifacts in accordance with aspects of the present technique.

FIG. 3 is a high level flowchart depicting exemplary steps of a reconstruction method for minimizing reconstruction artifacts in accordance with aspects of the present technique. In step 60, projection image data from the imaging system is accessed. This step may be followed by a filtering or a pre-processing of the projection image data. In step 62, a weight map is generated, such as from the processed or unprocessed projection image data or based upon prior knowledge. For example, generating a weight map may include identifying "high intensity" pixels or image regions in the projection image data that are likely to cause artifacts, and assigning generally lower weights to these regions. In step 64, the processed or unprocessed projection image data is backprojected to generate a reconstructed volumetric image based upon the projection image data and the weight map. Specifically, in one embodiment of the present technique, using the weight map, a weighted average of the backprojected image data is computed.

Figure 4:
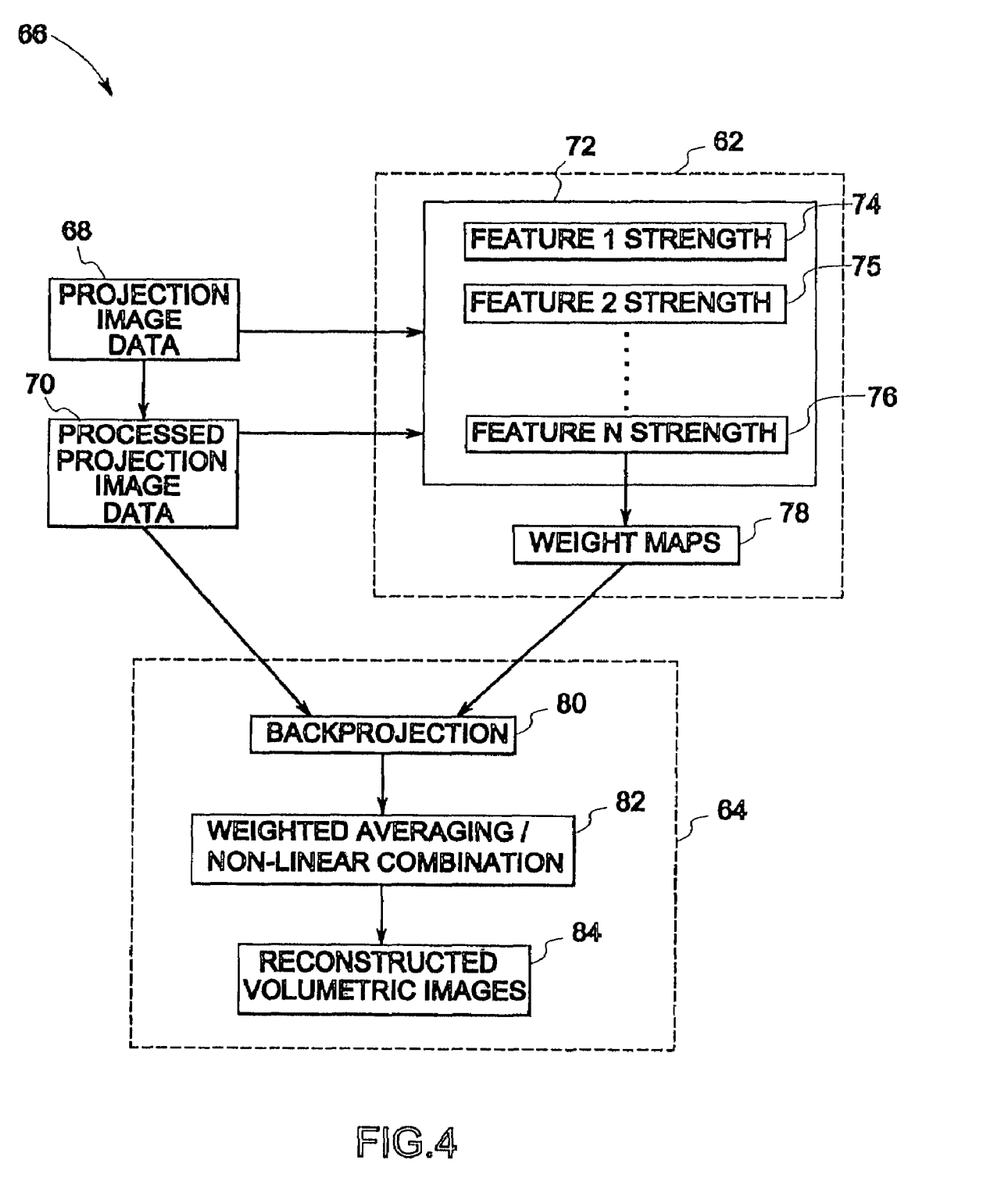
FIG. 4 is a somewhat more detailed flowchart illustrating exemplary logic for generating and applying weight maps for improving volumetric images in accordance with aspects of the present technique.

In particular, the present technique provides for associating a lower weight to a pixel or region in a projection image containing a feature that is likely to cause an artifact in the reconstructed volumetric images. A measure of the "strength" of the feature for all pixel locations in the projection image data is determined, and then a weight is assigned to each pixel comprising the projection image data based on the strength of the feature. Since some features in the image data are relatively easier to measure in the original projection images than in the filtered or processed projection images (and vice versa), the computation of the feature strength by aspects of the present technique may be performed from the original projection image data or from the processed/filtered projection image data, as appropriate. FIG. 4 describes in greater detail, the specific steps performed by the reconstruction method of the present technique for minimizing reconstruction artifacts.

FIG. 4 is a flowchart 66 describing, in somewhat greater detail, exemplary steps of a reconstruction method for minimizing reconstruction artifacts in accordance with aspects of the present technique. In step 68, projection image data, comprising two or more projection images acquired from different perspectives, is accessed. In step 70, the projection image data is filtered or processed to generate processed projection images. In some embodiments, filtering step 70 is not performed. In other embodiments, the filtering step 70 comprises filtering steps that are typically associated with tomographic reconstruction methods, as in Computer Tomography (CT) or in Tomosynthesis reconstruction. In yet another embodiment, the filters are suitably modified and optimized for the specific acquisition geometry and/or the characteristics of other steps of the reconstruction algorithm.

In step 78, one or more weight maps are generated from the projection image data. In accordance with one embodiment of the present technique, generating the weight map comprises generating a weight map based on at least one of the plurality of projection image data and the plurality of processed projection image data. In this embodiment, generating weight maps comprises assigning one or more weights to pixels associated with the at least one of the plurality of projection image data and the plurality of processed projection image data. More specifically, in some embodiments, assigning the weight comprises extracting or measuring one or more strength measures of a feature associated with the processed or unproccessed projection image data, and mapping the strength to the weight. In greater detail, as described below, in step 72 one or more feature strengths, 74, 75 and 76, for a plurality of pixels comprising the processed or unprocessed projection image data is initially computed. As described in FIG. 4, a measure of the "strength" of the feature for all locations in the projection image data is determined. As used herein, the features comprise local characteristics associated with the processed or unprocessed projection image data such as, for example, high contrast structures in the processed or unprocessed projection image data. The features may include, but are not limited to, image intensity, local image amplitude or contrast, local gradient values, local statistics such as variance values, measures of local texture characteristic and local noise properties associated with the unprocessed projection image data or the processed projection image data. Combinations of these features or other features may also be considered. These strength measures can be computed using any appropriate image processing or filtering method known in the art, including, but not limited to image space filtering techniques, frequency space filtering techniques, wavelet techniques, multi-scale techniques, multi-resolution techniques and morphological processing techniques. Further, the computation of feature strengths and/or weights may also be combined with a suitable filtering or morphological operator to spread or smooth the weight so that pixels in the neighborhood of the feature detected also receive low weights. In addition, determining the weights maps and/or feature strengths may comprise more complicated processing steps, for example determining a preliminary volumetric image.

In other embodiments, more complex features may be used, like specific patterns or structures in the image, edges or corners in the image, or membership in specific regions corresponding to certain characteristics. For example, matched filter, edge detection, and segmentation methods known in the art may be used to measure these features. In one embodiment, feature strength is assigned based on an initial reconstruction of the volumetric image. Feature strengths may generally be computed for one or more features, or combinations thereof.

Referring again to FIG. 4, the weight map is generated in step 78 from the projection image data by mapping the feature strengths, computed in steps 74, 75 and 76, to at least one weight. In practice, a weight map may be a pixel-by-pixel map or mask of weighting values for each corresponding pixel region, and one or multiple such maps may be generated for each projection image. The feature strength may be mapped to the weight based on a mapping function. In a specific embodiment, the mapping function may be defined such that the computed weights are generally inversely proportional to feature strength. For example, a relatively high feature strength, such as a high contrast feature in the projection image data, may be mapped to a relatively low weight. In one embodiment, this is achieved by inverting the feature strength, or by subtracting the feature strength from a suitable constant value.

Other feature strength to weight relationships may also exist. For example, the mapping from feature strengths to weights may be non-linear, such as where the mapping function comprises a sigmoid function. Alternatively, the mapping function may further be based on a pre-determined ratio assigned to the lowest to highest-weight. The mapping function may further be based on a data driven function. A data driven function, for example, is based on a plurality of rules applied to the computed feature strengths for assigning weights. In particular, the specific mapping function may utilize statistics of the measured feature strengths, for example by assigning the maximum and minimum weight, to the average feature strength minus N times the standard deviation, or to the average feature strength plus N times the standard deviation, respectively. In accordance with another embodiment of the present technique, the mapping function may be a many-to-one mapping function, wherein two or more feature strengths are mapped to a single weight. In such a case, the mapping function may be based on linear operators, such as addition and multiplication, or on non-linear operators, such as the minimum operator, or other operators.

Referring again to steps 74–78 of FIG. 4, in another embodiment of the present technique, measuring feature strengths and assigning the weights may also be based on measuring feature strengths based on the acquisition geometry associated with the imaging system. Referring to this embodiment, for a tomosynthesis system with a linear tube trajectory at a constant height above the detector, for any given voxel location, only pixels located on lines parallel to the tube trajectory may be backprojected onto that voxel location, while pixels that are located on different lines are always backprojected to different locations. Since the weight maps determine how pixel values that are backprojected into the same voxel location interact, the determination of weight maps and the determination of feature strengths may take this property into account and may determine weights and feature strengths based on information from pixels located on the corresponding line. Alternatively, the relative importance of pixels located on the corresponding line may be increased when computing feature strengths and/or weights for any given pixel. For other system geometries, other corresponding geometric preferences may enter into the determination of feature strengths and/or weights.

Thus, it should be borne in mind that the weight mapping performed in the present technique accounts for interactions between pixels in projection image data acquired for different source positions. Where such interactions do not occur, however, such mapping may be of less interest and may not be performed or constant value weights may be determined and employed.

Alternatively, weight maps may be generated or modified based on prior knowledge. This prior knowledge may include information of the presence and location of high contrast objects (e.g., collimator shadow). Similarly, a lower weight may be assigned to pixels located near the boundary of the detector to achieve a smooth transition in the reconstructed image in the vicinity of backprojected detector boundaries. As will be appreciated by those skilled in the art, assigning a lower weight to pixels associated with the projection image data at the boundary regions of the detector minimizes artifacts typically exhibited at voxel locations in the reconstructed volumetric image associated with these pixels. In accordance with another aspect of the above embodiment, the weights are assigned to pixels based on their location with respect to collimator shadows and/or to detector regions exhibiting malfunctions or anomalous output signals.

Referring once again to the figures, in step 80, the projection image data is backprojected to generate a reconstructed volumetric image based upon original, i.e., unprocessed, or pre-processed projection image data and the corresponding weight maps. In step 82, a weighted averaging is performed, wherein the backprojected projection image data is combined based on a weighted average function wherein the weights are determined by the respective weight maps. In step 84, the reconstructed volumetric images are generated. In alternate embodiments of the present technique, the backprojected projection image data may be combined based on linear or nonlinear combinations based on the respective weight maps, such as, for example, ranking or weighted ranking operators. For example, the backprojected pixel values may be combined through a weighted averaging step, where the backprojected pixel values corresponding to the N lowest weights, and/or the M highest weights, may be excluded from the combination.

In other embodiments, a projection image may have two or more weight maps associated with it, and the combination of the backprojected projection images may be based on more complex rules arbitrating between different sets of weights, corresponding to different image information. For example, in chest tomosynthesis, the tube trajectory for acquisition of the projection images at different projection angles may move parallel to the spine. Since in standard filtered backprojection approaches the edges of the ribs are likely to cause artifacts, an edge detector can now be used to measure edge strength, which is then mapped to a weight, where a lower weight is assigned to the edges of the ribs, and a higher weight is assigned to the "flat" image regions that don't contain edges of bones. In addition, or alternatively, by applying a derivative operator, such as a filtering operator in a direction parallel to the spine, the rib edge strength can be measured (determined, e.g., by the absolute value of the derivative) together with the edge orientation (i.e., is it an edge rib/background, or an edge background/rib), where the edge orientation information is contained in the sign of the derivative. In the backprojection and combination step, if two or more weight maps have a conflict, for example both show a high edge strength, but opposite edge orientations, then the combination rules may be such that at this location all pixel values that show a high edge strength are disregarded.

The embodiments described above have several advantages compared to existing reconstruction algorithms including, minimizing reconstruction artifacts as well as strategies for handling pixels corresponding to non-essential image information, e.g. at collimator shadows and detector boundaries. The present technique achieves the above advantages by assigning weights to pixels associated with the projection image data. Features in the projection image data that are likely to cause artifacts receive a relatively low or zero weight. As will be appreciated by those skilled in the art, when using reconstruction algorithms of the prior art, salient features in the projection image data generally create artifacts in the reconstructed volumetric images, except at their "true" location. As used herein, the "true location" refers to the physical three-dimensional location of the feature in the imaged object.

Significant structures in the projection image data may produce salient features, and the associated projection data will be given a relatively low weight in all projection images. Therefore, in the backprojection step, at the true location of the structure, all backprojected values will have essentially equal (or equally low) weight, and therefore all backprojected values are taken into account to a similar degree. At other locations, however, the backprojected values corresponding to the structure will typically have a lower weight than the other backprojected values, thereby minimizing the impact of corresponding structures on the reconstruction at that location. By assigning the weights accordingly, the reconstruction method in accordance with aspects of the present technique minimizes artifacts due to high-contrast structures within the reconstructed image data, including effects due to collimator shadows and detector boundaries.

As is apparent from the above discussion, the reconstruction method of the present technique is useful in applications that deal with reconstructions from incomplete data, such as tomosynthesis systems, for example. However, those skilled in the art will appreciate that the reconstruction method can be used in any application that performs a 3D reconstruction from projection image data. In addition, the reconstruction method in accordance with embodiments of the present technique can also be used in conjunction with any reconstruction method that uses a backprojection operator, either explicitly or implicitly. It can be used in conjunction with cone-beam, or parallel beam backprojection and shift-and-add techniques. In addition, the weighted backprojection step can also be used in conjunction with filtered backprojection type reconstructions, where only a single backprojection step is used. In this case, the features are generated from the filtered or unfiltered projection image data and the reconstructed volumetric images are generated as a combination of the backprojected filtered projection image data and the weight maps. The reconstruction method of the present technique can also be used in conjunction with iterative reconstruction techniques that comprise re-projection, comparison with the projection image data, and update procedures (e.g., comprising reconstruction based on difference images between original projection images, and re-projected images from the current estimate of the reconstructed volumetric image), such as for example in algebraic reconstruction (ART) or similar methods.

The embodiments illustrated above may comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed projection image data.

In the context of the present technique, the computer-readable medium may be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for generating reconstructed volumetric images, comprising:
   accessing a plurality of projection images;
   generating one or more weight maps; and
   generating a reconstructed volumetric image from the one or more weight maps and from at least one of the plurality of projection images and a plurality of processed projection images derived from the plurality of projection images.

2. The method, of claim 1, wherein the plurality of projection images is retrieved from at least one of an imaging system and a PACS system.

3. The method of claim 1, comprising:
   filtering the plurality of projection images to generate the plurality of processed projection images.

4. The method, of claim 1, wherein generating the reconstructed volumetric image comprises backprojecting at least one of the plurality of projection images and the plurality of processed projection images.

5. The method of claim 4, further comprising:
   combining the at least one of the plurality of projection images and the plurality of processed projection images based on a weighted average function derived from the one or more weight maps.

6. The method of claim 4, further comprising:
   combining the at least one of the plurality of projection images and the plurality of processed projection images in a linear or non-linear manner based upon the one or more weight maps.

7. The method of claim 1, wherein generating the one or more weight maps comprises generating a weight map based on at least one of the plurality of projection images and the plurality of processed projection images.

8. The method of claim 7, wherein generating the one or more weight maps comprises assigning one or more weights to a plurality of pixels associated with at least one of the plurality of projection images and the plurality of processed projection images.

9. The method of claim 8, wherein assigning the one or more weights comprises extracting one or more strength measures of a feature associated with at least one of the plurality of projection images and the plurality of processed projection images.

10. The method of claim 9, further comprising mapping the one or more strength measures of the feature to the one or more weights based on a mapping function.

11. The method of claim 9, wherein the feature comprises at least one of intensity, contrast, gradient, edges, corners, local statistics, local texture characteristics and membership in specific regions associated with at least one of the plurality of projection images and the plurality of processed projection images.

12. The method of claim 9, wherein the one or more strength measures is computed using techniques selected from the group consisting of image space filtering techniques, frequency space filtering techniques, wavelet techniques, multi-scale techniques, multi-resolution techniques and morphological processing techniques.

13. The method, of claim 8, wherein generating the reconstructed volumetric image comprises backprojecting the one or more weight maps.

14. The method, of claim 1, wherein generating the one or more weight maps comprises generating the weight map based upon prior knowledge.

15. The method of claim 1, wherein the plurality of projection images comprises X-ray images.

16. A method for generating a reconstructed volumetric image from projection image data acquired from an X-ray tomosynthesis imaging system comprising:
    accessing a plurality of projection images;
    generating one or more weight maps;
    backprojecting at least one of the plurality of projection images and a plurality of processed projection images derived from the plurality of projection images; and
    generating a reconstructed volumetric image from the one or more weight maps and from the backprojected images.

17. The method of claim 16, comprising filtering the plurality of projection images to generate the plurality of processed projection images.

18. The method, of claim 16, wherein generating the one or more weight maps comprises generating a weight map based on at least one of the plurality of projection images and the plurality of processed projection images.

19. The method of claim 18, wherein generating the one or more weight maps comprises assigning one or more weights to a plurality of pixels associated with at least one of the plurality of projection images and the plurality of processed projection images.

20. The method, as recited in claim 19, wherein generating the reconstructed volumetric image comprises backprojecting the one or more weight maps.

21. The method of claim 19, wherein assigning the one or more weights comprises extracting one or more strength measures of a feature associated with at least one of the plurality of projection images and the plurality of processed projection images.

22. The method of claim 21, further comprising mapping the one or more strength measures of the feature to the one or more weights based on a mapping function.

23. The method of claim 21, wherein the feature comprises at least one of intensity, contrast, gradient, edges, corners, local statistics, local texture characteristics and membership in specific regions associated with at least one of the plurality of projection images and the plurality of processed projection images.

24. The method, of claim 16, wherein generating the one or more weight maps comprises generating the weight map based upon prior knowledge.

25. The method of claim 16, wherein generating the reconstructed volumetric image comprises combining the at least one of the plurality of projection images and the plurality of processed projection images based on a weighted average derived from the one or more weight maps.

26. The method of claim 16, wherein generating the reconstructed volumetric image comprises combining the at least one or more of the plurality of projection images and the plurality of processed projection images in a linear or non-linear manner based upon the one or more weight maps.

27. An imaging system for generating a reconstructed volumetric image, the system comprising:
    an X-ray source configured to project an X-ray beam from a plurality of positions through a subject of interest;
    a detector configured to produce a plurality of signals corresponding to the X-ray beam; and
    a computer configured to process the plurality of signals to generate a plurality of projection images, each projection image comprising a respective plurality of pixels, wherein the computer is further configured to generate one or more weight maps, and to generate a reconstructed volumetric image from the one or more weight maps and from at least one of the plurality of projection images and a plurality of processed projection images derived from the plurality of projection images.

28. An imaging system for generating a reconstructed volumetric image from projection image data, the system comprising:
   means for accessing a plurality of projection images;
   means for generating one or more weight maps; and
   means for generating a reconstructed volumetric image from the one or more weight maps and from at least one of the plurality of projection images and a plurality of processed projection images derived from the plurality of projection images.

29. A computer-readable medium storing computer instructions for instructing a computer system to generate a reconstructed volumetric image, the computer instructions comprising:
   a routine for accessing a plurality of projection images;
   a routine for generating one or more weight maps; and
   a routine for generating a reconstructed volumetric image from the one or more weight maps and from at least one of the plurality of projection images and a plurality of processed projection images derived from the plurality of projection images.

30. A computer-readable medium storing computer instructions for instructing a computer system to generate a reconstructed volumetric image from projection image data acquired from an X-ray tomosynthesis imaging system, the computer instructions comprising:
   a routine for accessing a plurality of projection images;
   a routine for generating one or more weight maps;
   a routine for backprojecting at least one of the plurality of projection images and a plurality of processed projection images derived from the plurality of projection images;
   a routine for backprojecting the one or more weight maps; and
   a routine for generating a reconstructed volumetric image from the backprojected images and the backprojected weight maps.

* * * * *